United States Patent [19]
Dahlbacka

[11] Patent Number: 5,344,215
[45] Date of Patent: Sep. 6, 1994

[54] BACKREST RECLINER MECHANISM

[75] Inventor: Bruce B. Dahlbacka, Port Washington, Wis.

[73] Assignee: Milsco Manufacturing Company, Milwaukee, Wis.

[21] Appl. No.: 29,105

[22] Filed: Mar. 10, 1993

[51] Int. Cl.⁵ ............................................. B60N 2/20
[52] U.S. Cl. ................................. 297/375; 297/291; 297/300
[58] Field of Search .............. 297/285, 300, 354.12, 297/354.13, 363–369, 372, 375, 373, 374, 291

[56] References Cited

U.S. PATENT DOCUMENTS

| | | | |
|---|---|---|---|
| 2,750,994 | 6/1956 | Howell, Jr. | 297/375 |
| 3,876,248 | 4/1975 | Gillentine | 297/375 |
| 4,099,777 | 7/1978 | Chekirda | 297/375 |
| 4,579,386 | 4/1986 | Rupp et al. | |
| 4,682,814 | 7/1987 | Hansen | |
| 4,756,575 | 7/1988 | Dicks | |
| 4,770,465 | 9/1988 | Wiers | 297/375 |
| 4,887,864 | 12/1989 | Ashton | 297/375 |
| 4,898,424 | 2/1990 | Bell | 297/375 X |
| 4,913,492 | 4/1990 | Shovar | |

Primary Examiner—Kenneth J. Dorner
Assistant Examiner—Milton Nelson, Jr.
Attorney, Agent, or Firm—Nilles & Nilles

[57] ABSTRACT

A backrest recliner mechanism for a vehicle seat or the like includes a connector and a locking mechanism which both pivot about the same line. The backrest recliner mechanism also utilizes the energy of the backrest biasing spring to aid in the return of the locking mechanism from a disengaged to engaged position. The mechanism is actuated by a handle which minimizes the forces required to unlatch the locking mechanism. The backrest recliner mechanism is designed so as to incorporate a minimum number of parts and also to be easily and quickly assembled with minimal modification of the seat shell.

26 Claims, 10 Drawing Sheets

BACKREST RECLINER MECHANISM

BACKGROUND OF THE INVENTION

1. Field of the Invention

The invention relates to mechanisms for reclining the backrests of seats and, more particularly, relates to a mechanism for selectively permitting the reclining of a backrest of a vehicle seat or the like.

2. Discussion of the Related Art

Backrest recliner mechanisms are well known and are commonly used to selectively permit the occupant of a seat to adjust the angle of inclination of the backrest to best suit his or her needs. Such devices typically include a member which operatively connects the seat back to the base of the seat and which, when acted upon by the seat occupant in a designated manner, permits the backrest to recline. One such recliner mechanism is disclosed in U.S. Pat. No. 4,579,386 to Rupp et al. The recliner mechanism disclosed by Rupp et al. includes first and second elongated members each of which is connected to one of the seat base and backrest at a first end and to the other member at the second end. The first and second members are normally locked together by a handle extending therethrough at the point where the members overlap. The handle has one end which is shaped so as to lockingly engage detents formed in a slot formed in the second of the members. The backrest is permitted to recline by rotating the handle to disengage the face of the handle from the detents so that the first and second members can slide relative to one another. When the seat has been reclined to its desired position, the handle is released and is rotated back into engagement with the detents under the operation of a torsion spring.

The recliner mechanism disclosed by Rupp et al. exhibits several disadvantages. For instance, it is relatively complex and requires that the first and second members slidably engage one another over a significant length and that they be connected to one another not only by the handle but also by pins disposed on either side of the handle. Accordingly, assembly of this device requires a relatively high amount of skilled labor. Moreover, any rotation of the handle is resisted not only by the torsion spring but also by the backrest biasing spring which applies significant biasing forces on the face of the handle at all times.

OBJECTS AND SUMMARY OF THE INVENTION

It is therefore an object of the invention to provide a backrest recliner mechanism which is easy to assemble, which has a minimum of parts, and which requires a minimum of modifications to an existing seat structure.

In accordance with this aspect of the invention, the backrest recliner mechanism includes a connector having a first end which is connectable to the backrest portion of a seat shell assembly and having a second end supported on a seat cushion portion of the seat shell; a backrest biasing spring which, in use, biases the backrest portion towards an extreme position, typically an upright position; and a locking mechanism which engages the connector between the first and second ends. The locking mechanism is movable from (1) a first position preventing movement of the connector relative to the locking mechanism to (2) a second position permitting movement of the connector relative to the locking mechanism. The locking mechanism is biased towards the first position by the backrest biasing spring.

Preferably, the connector comprises a connecting rod and the locking mechanism is provided on a housing which is pivotable from the first position to the second position, which is supported on the seat cushion portion, and which has engagement devices which form the locking mechanism and which lockingly engage mating engagement devices on the connecting rod.

Another object of the invention is to provide a backrest recliner mechanism for a backrest which, while incorporating a minimum of parts, requires minimal actuating forces.

In accordance with this aspect of the invention, a backrest recliner mechanism of the type described above is utilized, and is additionally constructed such that the housing engages a second abutment surface of a spring retainer the first surface of which engages the backrest biasing spring. The housing and second abutment surface have complimentary surfaces which are biased into engagement with one another by the backrest biasing spring such that the second abutment surface of the spring retainer urges the housing towards the first position. A locking pawl biasing spring is connected to the locking pawl and to the housing and biases the locking pawl and the integral actuating handle towards the position of rest.

If minimizing actuating forces is not considered necessary, the locking pawl itself may abut the second abutment surface of the spring retainer after a designated angle of rotation so that further rotation of the handle with respect to the housing is resisted by the backrest biasing spring.

Still another object of the invention is to provide a seat having a backrest which can be easily tilted to a reclining position and which automatically returns to an upright position.

In accordance with this aspect of the invention, a seat is provided having a seat cushion portion, a backrest portion pivotally connected thereto, and a backrest recliner mechanism of the type described above.

Other objects, features, and advantages of the present invention will become more readily apparent to those skilled in the art from the following detailed description. It should be understood, however, that the detailed description and specific examples, while indicating preferred embodiments of the present invention, are given by way of illustration and not by limitation. Many changes and modifications within the scope of the present invention may be made without departing from the spirit thereof, and the invention includes all such modifications.

BRIEF DESCRIPTION OF THE DRAWINGS

The above and further objects of the invention will become more readily apparent as the invention is more clearly understood from the detailed description to follow, reference being made to the accompanying drawings in which like reference numerals represent like parts throughout and in which.

DETAILED DESCRIPTION OF THE PREFERRED EMBODIMENTS

1. Resume

A seat is provided having a backrest portion which is permitted to recline with respect to a seat base or seat cushion portion by selective operation of a backrest recliner mechanism. The backrest recliner mechanism includes a connector and a locking mechanism which both pivot about the same line. The backrest recliner mechanism also utilizes the energy of the backrest biasing spring to aid in the return of the locking mechanism from a disengaged to engaged position. The mechanism is actuated by a handle which minimizes the forces required to unlatch the locking mechanism. The backrest recliner mechanism is designed so as to incorporate a minimum number of parts and also to be easily and quickly assembled with minimal modification of the seat shell.

2. System Overview

Figure 1:
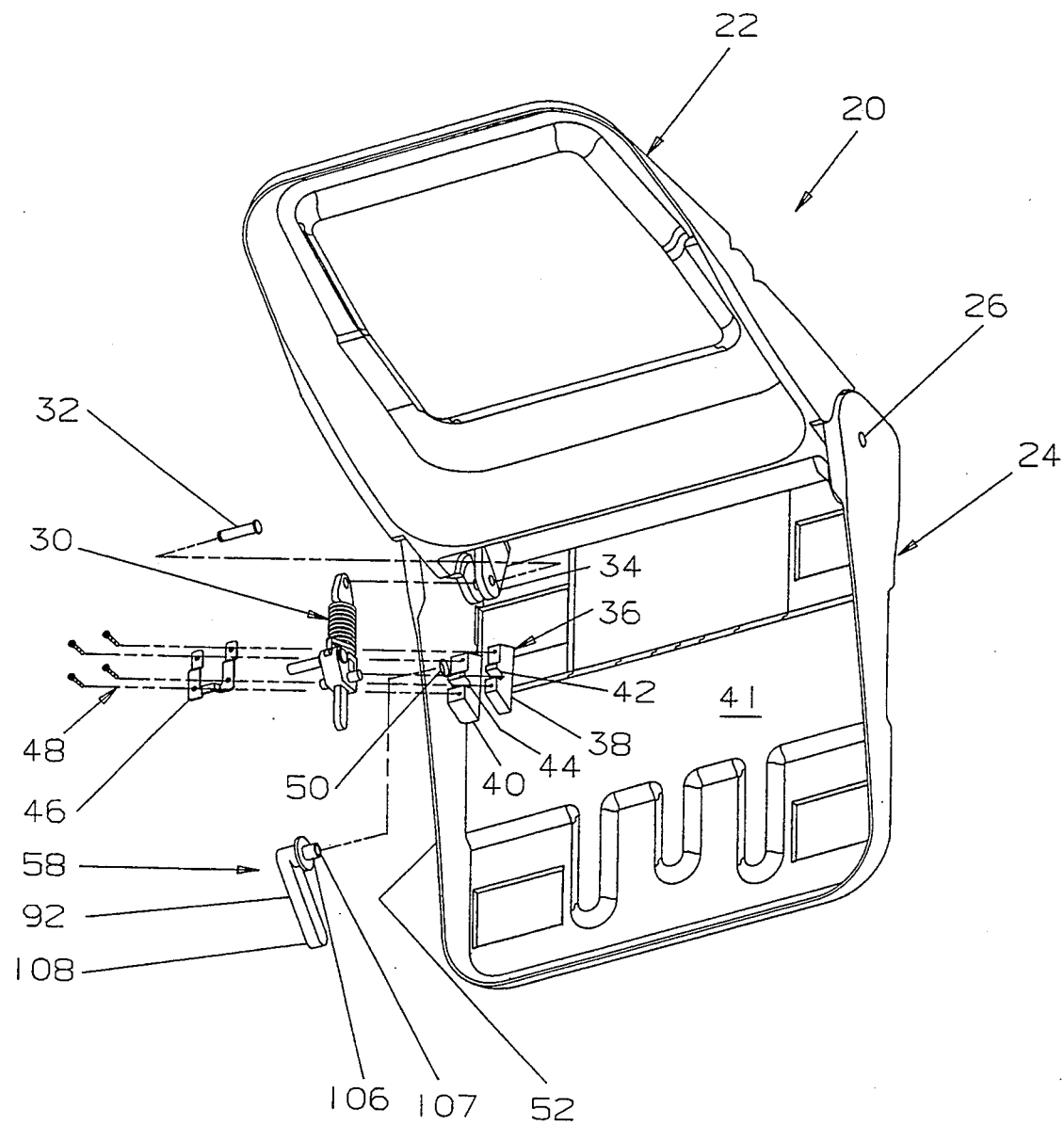
FIG. 1 is a perspective view of the shell of a seat incorporating a backrest recliner mechanism constructed in accordance with a first embodiment of the present invention.
Figure 2:
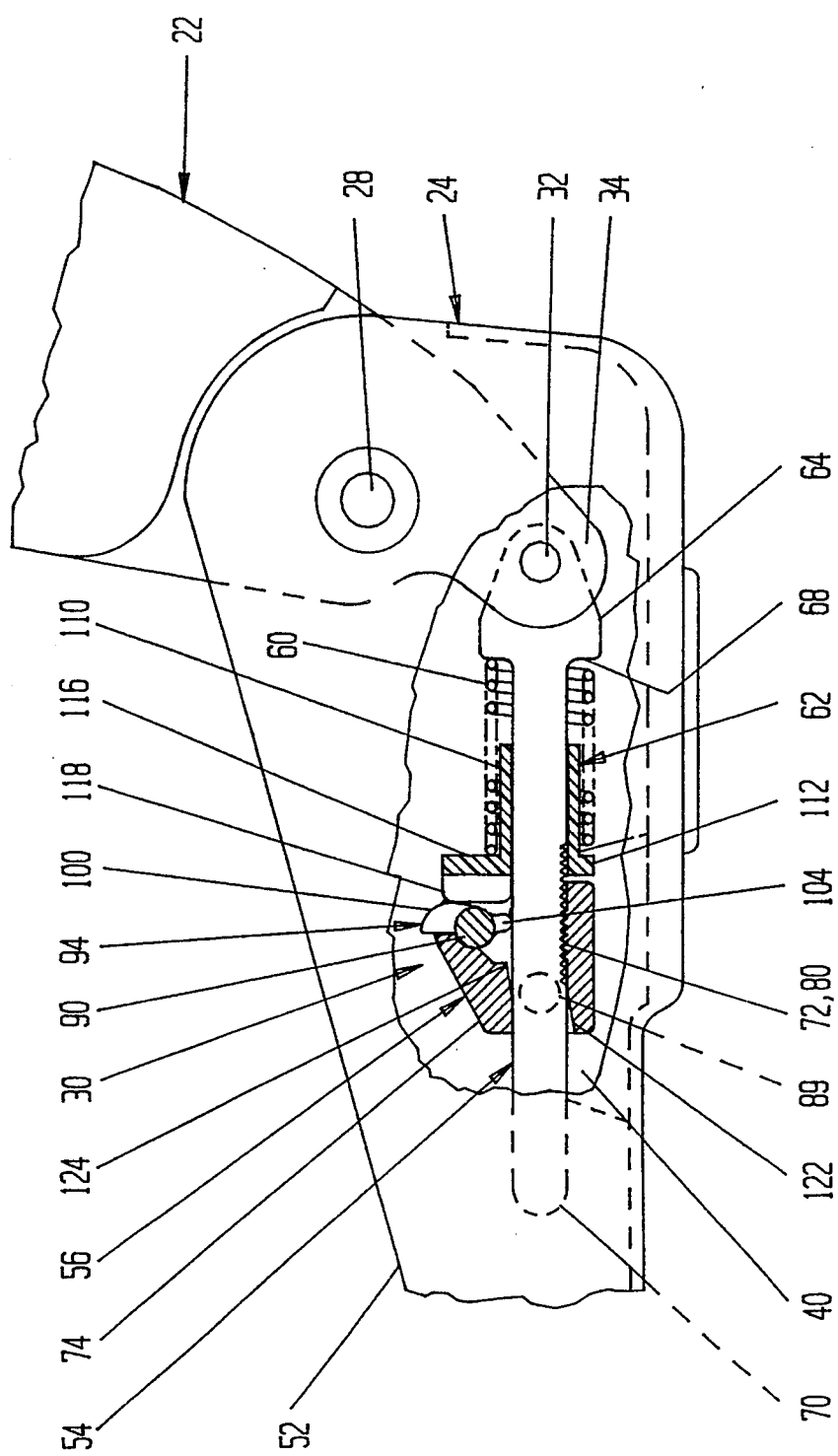
FIG. 2 is a side elevation view of the backrest recliner mechanism and a portion of the seat shell of FIG. 1 with part of the seat shell cut away to reveal the backrest recliner mechanism.
Figure 3:
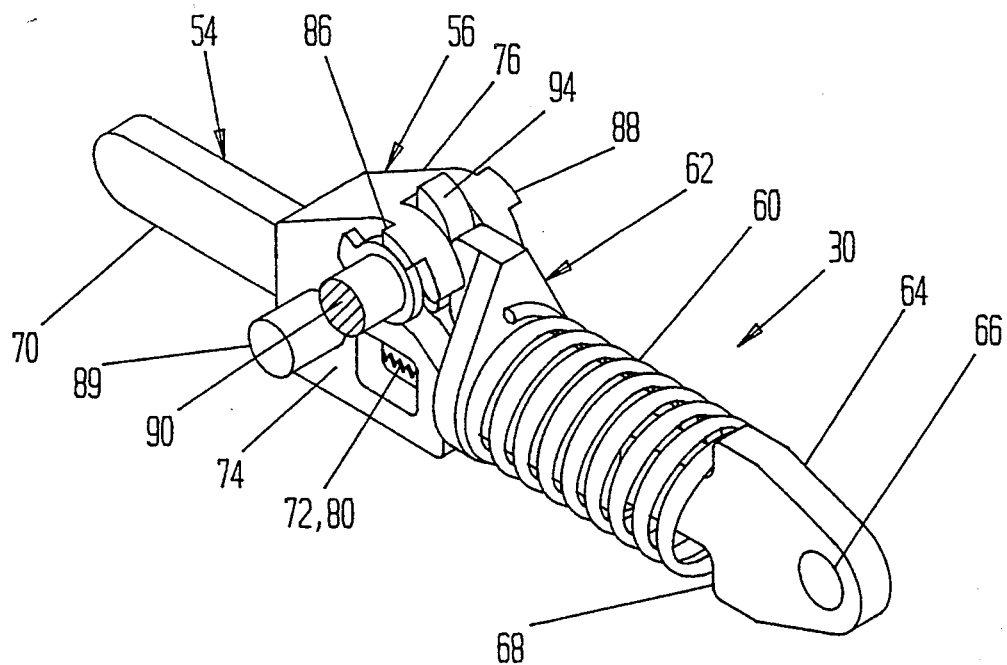
FIG. 3 is a perspective view of the backrest recliner mechanism of FIGS. 1 and 2.
Figure 10:
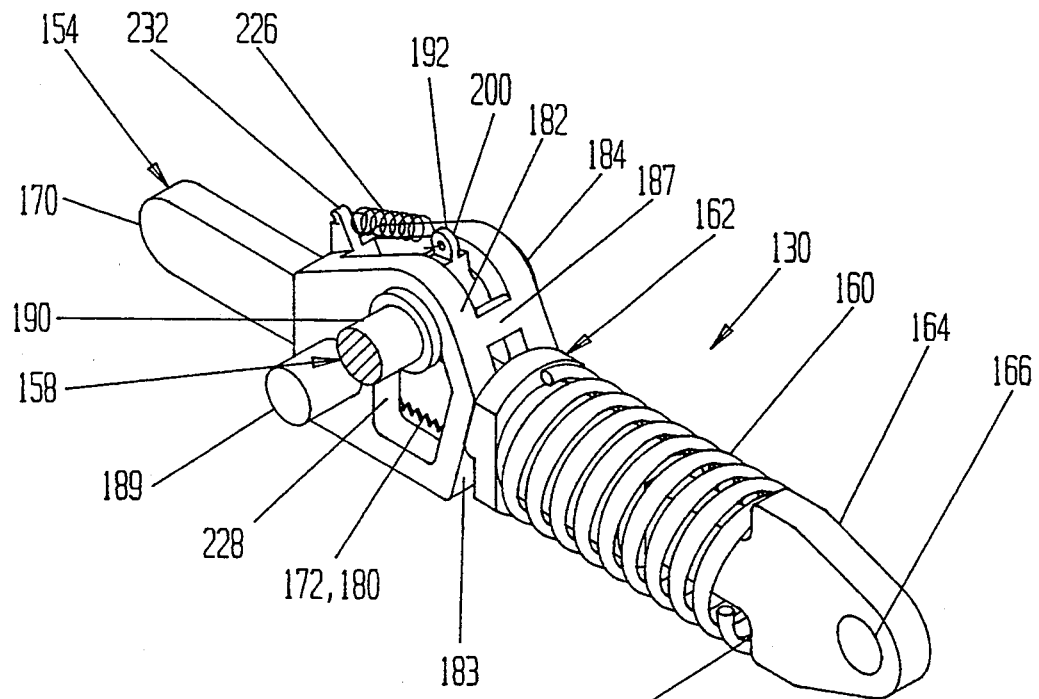
FIG. 10 is a perspective view of the backrest recliner mechanism illustrated in FIG. 9.
Figure 4:
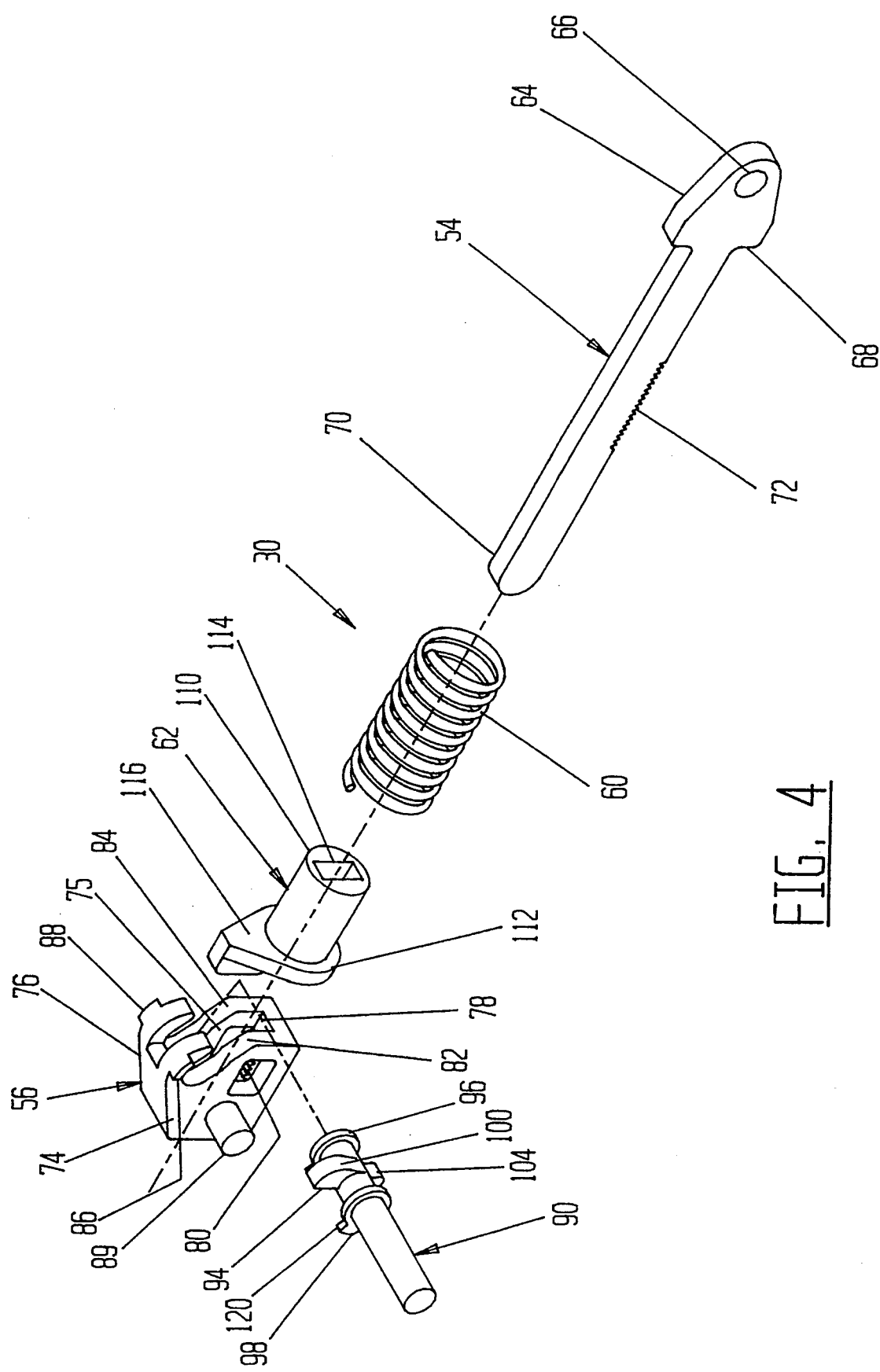
FIG. 4 is an exploded perspective view of the backrest recliner mechanism of FIG. 3.

Referring to FIGS. 1 and 2, a seat assembly 20 constructed in accordance with the preferred embodiment of the invention includes a shell having a backrest portion 22 pivotally connected to a seat base or cushion portion 24 by suitable pivot pins 26, 28 at corresponding pivot points. Seat assembly 20, though usable in virtually any application, would typically be mounted on an industrial vehicle such as a grader, tractor, etc. The shell portions 22 and 24 as illustrated are molded from a suitable plastic which is reinforced with fiberglass. However, it is to be understood that portions 22 and 24 could be constructed from any suitable material and, in their simplest form, could be constructed as simple metal or plastic frames.

Reclining of the backrest portion 22 with respect to the seat cushion portion 24 about pivot pins 26 and 28 is controlled by a backrest recliner mechanism 30 which, in the illustrated embodiment, biases the backrest portion 22 towards an upright position. Although a single backrest recliner mechanism 30 is illustrated on the right side of seat assembly 20, mechanism 30 could also be located on the left side or the center of the seat if desired. Moreover, two such mechanisms could be provided on opposite sides of the seat and controlled by a single handle connected to one another by a suitable connecting rod.

Backrest recliner mechanism 30 has a first end pivotally connected to the backrest portion 22, at a point below the pivot pin 26, by a pivot pin 32 extending through a clevis 34. Although the clevis 34 of the illustrated embodiment is located beneath pivot pin 26, it could, if desired, be located above pivot pin 26 so that the backrest portion 22 is normally biased towards a reclining position, as opposed to an upright position. The second (front) end of backrest recliner mechanism 30 is pivotally mounted on the seat cushion portion 24 by laterally spaced sections 38 and 40 of a cradle 36 formed from blocks mounted on the base 41 of the seat cushion portion 24. Each of the blocks 38 and 40 has a semi-cylindrical seat 42, 44 formed therein for receiving a respective end of the trunnion 89 of backrest recliner mechanism 30. Backrest recliner mechanism 30 is secured to the cradle 36 by a retaining clip 46 via screws 48. A hole 50 is formed in the side wall 52 of the seat cushion portion 24 to receive the handle of the backrest recliner mechanism 30.

The foregoing description defines the arrangement via which the backrest recliner mechanism 30 of the first embodiment is mounted to the seat shell 20. The same arrangement is used to mount the backrest recliner mechanism 130 of the second embodiment of the invention to seat shell 20. Each of these backrest recliner mechanisms will now be described in turn.

3. First Embodiment of the Backrest Recliner Mechanism

Referring now to FIGS. 1–8, backrest recliner mechanism 30 includes a connector which in the illustrated embodiment comprises a connecting rod 54 slidably received in a housing 56 which also receives a portion of an actuating handle 58. Connecting rod 54 supports a backrest biasing spring 60 and a spring retainer 62. A locking mechanism 80 is provided on the housing 56 and selectively engages the connecting rod 54. This locking mechanism, when engaged, prevents the seat back portion 22 from reclining and, when disengaged, permits such reclining.

Connecting rod 54 is elongated and includes a first end 64 having a transverse bore 66 formed therethrough for receiving the pin 32, and presenting a shoulder 68 which engages the rear end of spring 60. The remainder of connecting rod 54 is of a reduced cross section and extends towards the front of the seat cushion portion 24 and terminates in a second end 70. Connecting rod 54 also has a plurality of teeth 72 formed thereon which act as engagement devices for engaging the locking mechanism formed by the complementary teeth 80 formed on the housing 56. In the illustrated embodiment, connecting rod 54 is formed from a single generally rectangular steel element, but the connector formed by this rod could be constructed out of any combination of elements performing the desired function. This rod should be sufficiently long so that the distance from shoulder 68 of first end 64 to the second end 70 can accommodate maximum extension of backrest biasing spring 60 and maximum permitted rotation of backrest portion 22 about pivot pin 26, while still being supported at its front end in the housing 56. This length will vary with the maximum required extension and maximum possible compression of spring 60 and permitted rotation of backrest portion 22.

Housing 56 is preferably formed from an integral steel element having opposed side walls 74 and 76 defining a longitudinal slot 75 (FIG. 4) therebetween for passage of the connecting rod 54 and for receiving the second abutment surface 118 of the spring retainer 62 discussed in more detail below. The side walls 74 and 76 are connected at their lower ends by a base 78 (FIG. 4) which supports the connecting rod 54 and which has engagement devices in the form of teeth 80 which are formed thereon and which act as a locking mechanism which mates with the teeth 72 of connecting rod 54. Each of the rear faces 82 and 84 of the side walls 74 and 76 is formed generally in the shape of a question mark and has lateral projections 86, 88 formed proximate the upper ends thereof. A trunnion 89 for pivotally mounting the housing 56 on the cradle 36 is formed from two cylindrical projections each extending laterally from a respective side wall 74, 76 of the housing 56.

Actuating handle 58 preferably includes a locking pawl actuator 90 and a lever 92. Locking pawl actuator 90 is rotatably mounted in the housing 56 proximate the upper end thereof and has a locking pawl 94 flanked by an inner head 96 and an outer locking ring 98 (FIG. 3) each of which is formed integral with the locking pawl actuator 90. Head 96 and locking ring 98 prevent the locking pawl actuator 90 from sliding transversely of housing 56 after the locking pawl actuator is inserted into the housing 56. Locking pawl 94 has a head 100 and a tail 104. Head 100 presents a rear face for engaging the second abutment surface 118 of the spring retainer 62 discussed in more detail below. Locking pawl actuator 90 further includes projections 120 on ring 98 and head 96 which engage projections 86 and 88 on the housing 56 upon rotation of the handle 58 in a manner discussed in more detail below.

The free end of locking pawl actuator 90 of handle 58 extends through the hole 50 formed in the side wall 52 of seat cushion portion 24 and detachably mates with the lever 92. Lever 92 is generally L-shaped and has a shorter portion presenting a washer 106 and an annular lug 107 which mate with the locking pawl actuator 90, and a second portion forming a grip 108 which can be grasped by the operator to rotate the handle 58.

Spring retainer 62 includes a generally cylindrical plastic body 110 having a head 112 formed integral with a front end thereof. The head 112 is formed with a first abutment surface 116 which engages the front end of spring 60 and an opposed second abutment surface 118 which normally extends between the hooks formed by the upper ends of the side walls 74 and 76 of the housing 56 and which is engaged by the rear face of locking pawl 94. Spring retainer 62 also has a generally rectangular longitudinal slot 114 formed therethrough which slidably receives the connecting rod 54.

Backrest biasing spring 60 is a compression spring which is relatively stiff so as to apply significant biasing forces to the backrest portion 22 of seat shell 20 so as to bias the backrest portion to an extreme position which, in the illustrated embodiment comprises an upright position. Spring 60 may be formed from steel or any other suitable material.

The backrest recliner mechanism 30 and reclining seat assembly 20 operate as follows.

Figure 5:
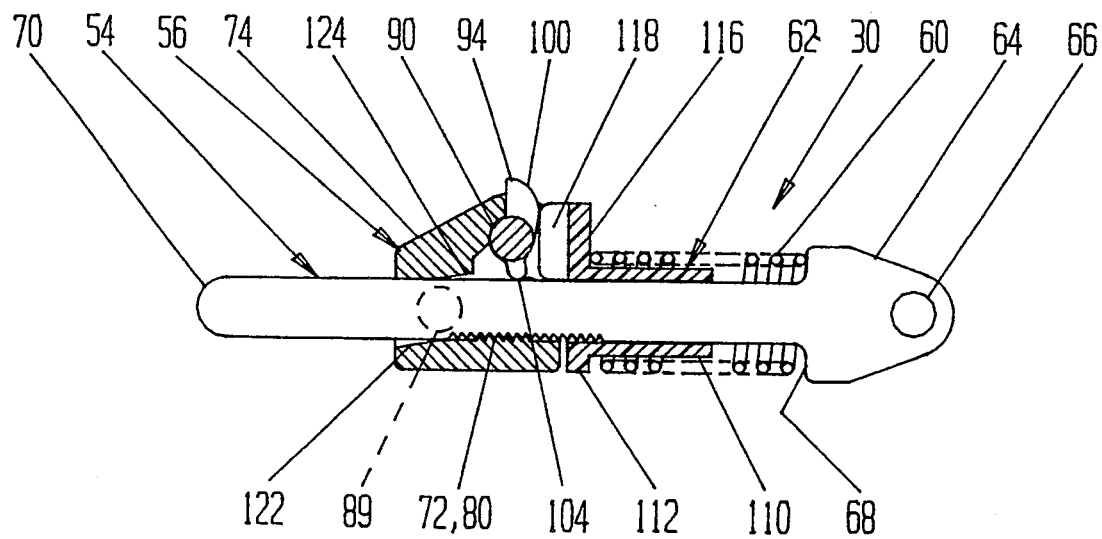
FIG. 5 is a side elevation view taken along the lines 5—5 of FIG. 3.

During normal operation, the backrest recliner mechanism 30 assumes the position illustrated in FIG. 5 in which the slot 75 formed in housing 56 extends generally in parallel with the connecting rod 54 so that the complimentary teeth 72 and 80 formed respectively on the connecting rod 54 and housing 56 engage one another and prevent the connecting rod 54 from sliding with respect to the housing 56.

Figure 6:
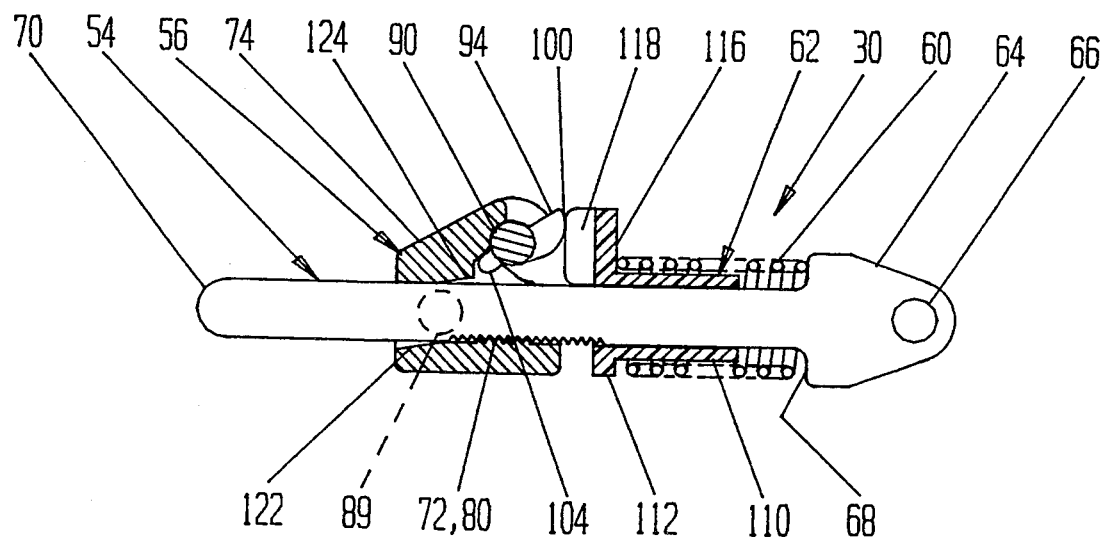
FIGS. 6–8 are sectional side elevation views, corresponding to FIG. 5, which show the backrest recliner mechanism in different stages of operation.

Assuming that the operator wishes to recline the backrest portion 22 of seat assembly 20, he or she releases the locking mechanism formed by teeth 80 by rotating the actuating handle 58 from the position illustrated in FIG. 5 to that illustrated in FIG. 6. During this rotation, the tail 104 of the locking pawl 94 rotates through an over-center position. This rotation is resisted through substantially its entire stroke by the backrest biasing spring 60, which is compressed via contact between the rear face of locking pawl 94 and the second abutment surface 118 of the spring retainer 62. At the end of this rotation, projections 120 of the locking ring 98 and head 96 act as stops which engage the lateral projection 86 and 88 of the front face 82, thus preventing further rotation of the handle 58 relative to the housing 56.

Figure 7:
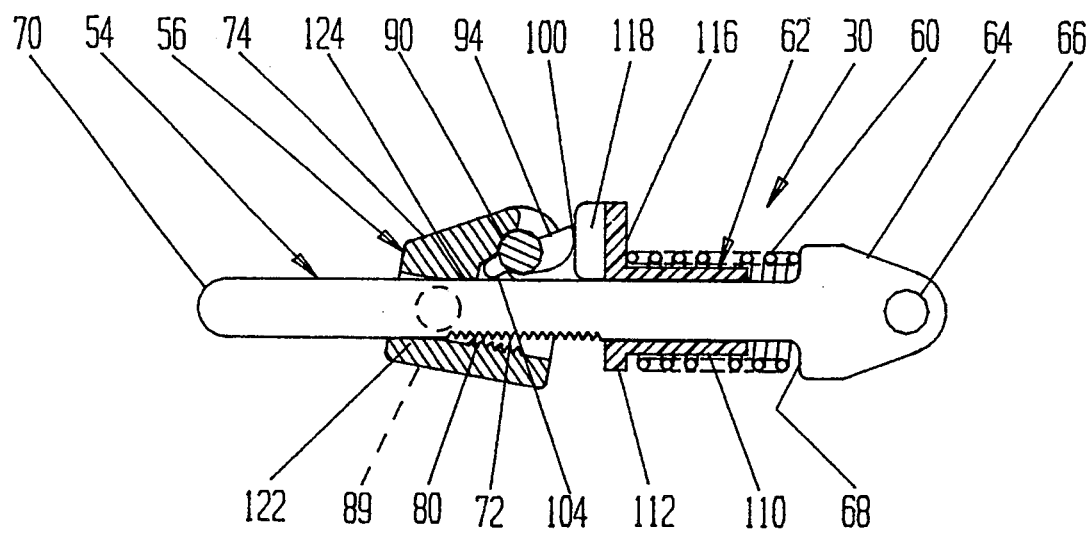
Figure 8:
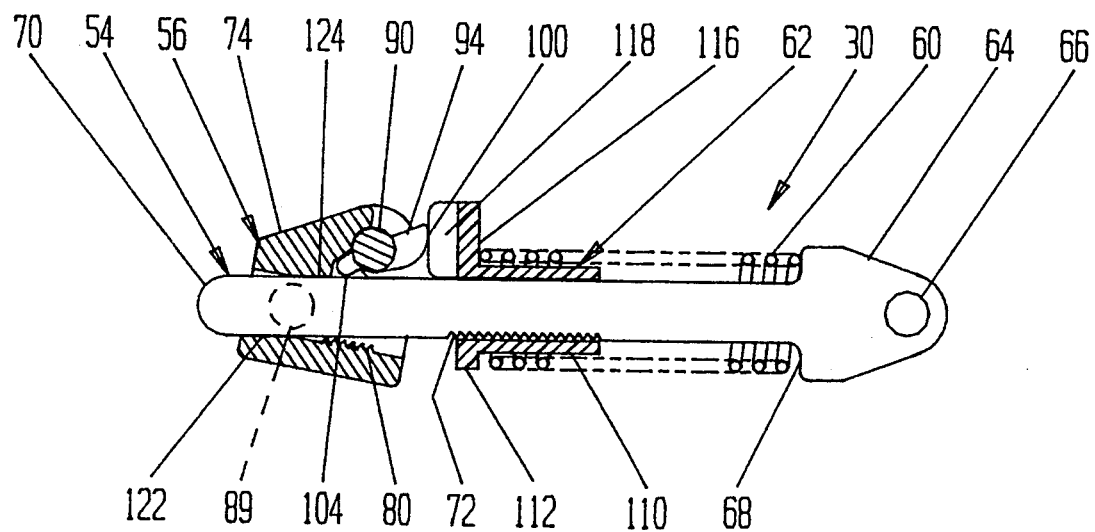
Figure 9:
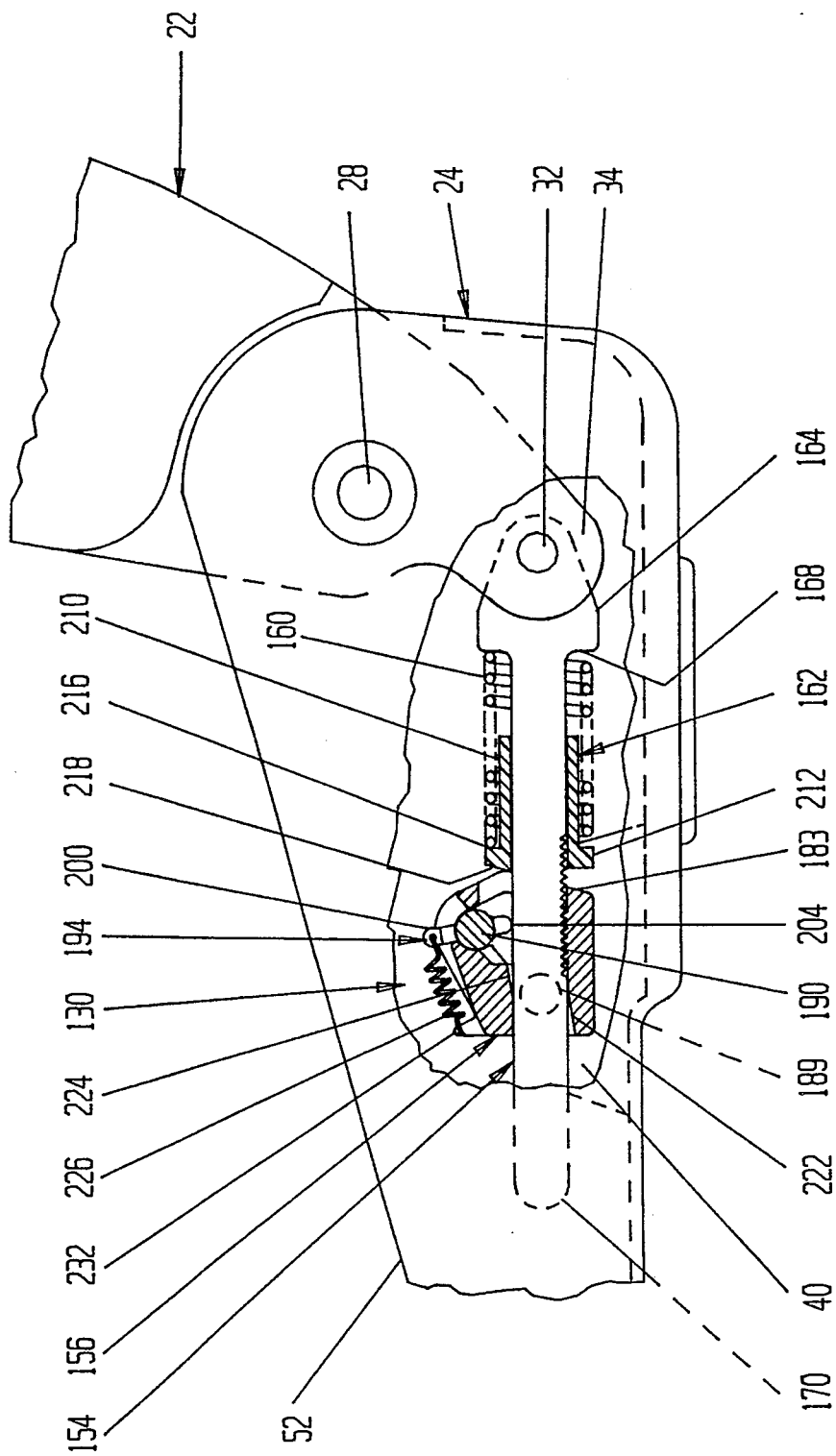
FIG. 9 is a side elevation view of a seat shell incorporating a backrest recliner mechanism constructed in accordance with a second embodiment of the invention with a portion of the seat shell cut away to reveal the backrest recliner mechanism, and with the backrest recliner mechanism illustrated partially in cross section.
Figure 11:
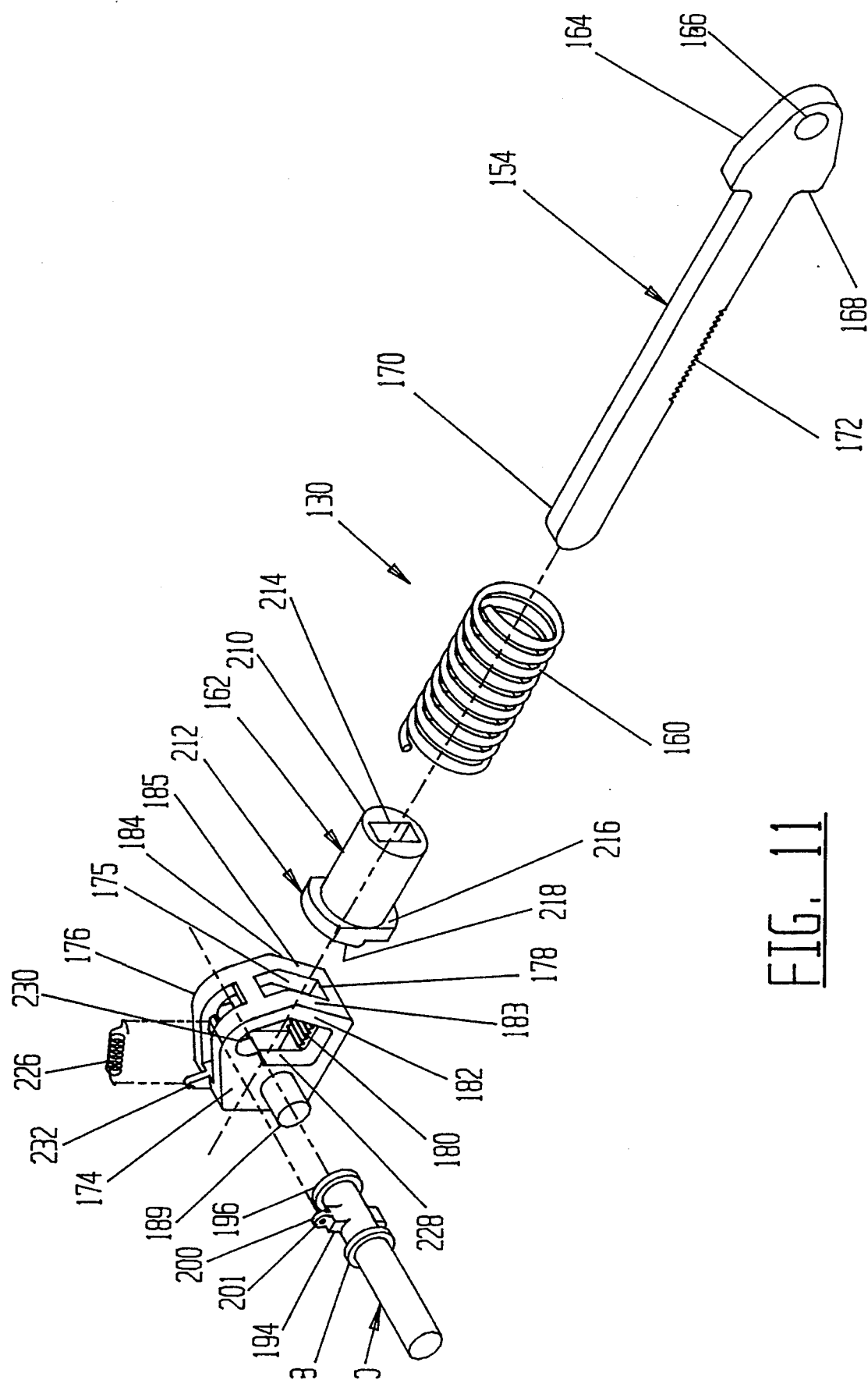
FIG. 11 is an exploded perspective view of the backrest recliner mechanism of FIGS. 9 and 10.
Figure 12:
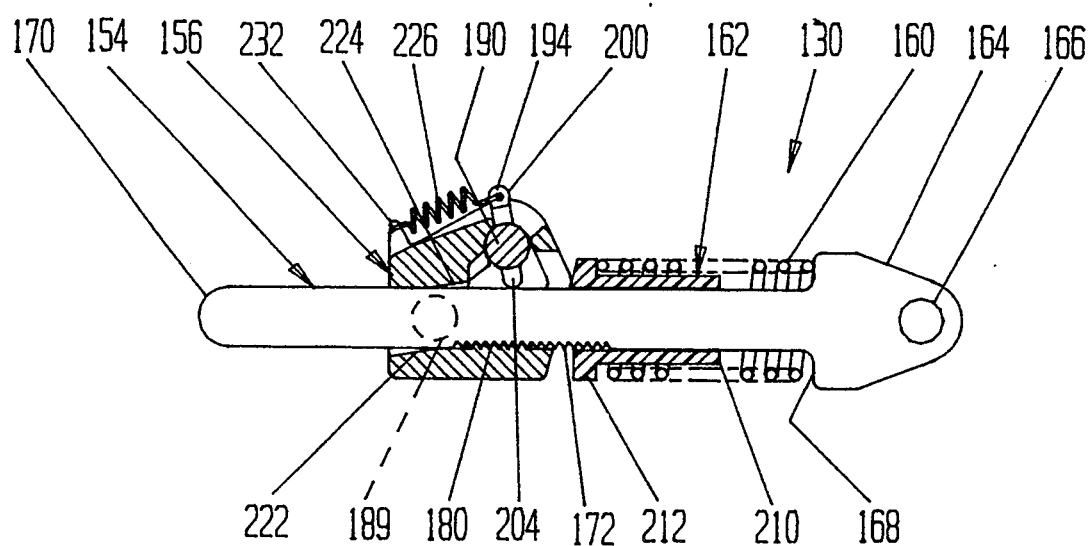
FIGS. 12–15 are sectional side elevation views illustrating the backrest recliner mechanism of FIGS. 9–11 in various stages of operation.

As illustrated in FIGS. 7 and 8, further rotation of the handle 58 results in rotation of the housing 56 with respect to the connecting rod 54 about a pivot line formed by trunnion 89 against the biasing force of backrest biasing spring 60. This relative rotation is permitted by forming the slot 75 in housing 56 such that the lower support surface of its front end 122 slopes downwardly and the upper support surface of its rear end 124 slopes upwardly. This rotation separates the teeth 72 on the connecting rod 54 from the mating teeth 80 on the housing 56, thus disengaging the locking mechanism formed by teeth 80 and permitting the connecting rod 54 to slide with respect to the housing 56. Rearward movement of the rod 54, illustrated in FIG. 8, is assisted by the biasing force of the spring 60 and permits the backrest portion 22 to pivot from a reclined position to an upright position. Conversely, forward movement of rod 54 permits the backrest portion 22 to recline further against the force of backrest biasing spring 60. The connecting rod 54 and housing 56 pivot as a unit about a pivot line formed by the trunnion 89 as the backrest portion 22 pivots so that the connecting rod 54 always extends generally orthogonally to the pivot pin 32.

When the handle 58 is released, the backrest biasing spring 60 applies a force through the second abutment surface 118 of spring retainer 62 to the rear face of locking pawl 94 to urge rotation of the housing 56 about trunnion 89 concurrently with rotation of locking pawl 94. If the connecting rod 54 is in a position in which the mating teeth 72 and 80 can mesh with one another, the front face of locking pawl 94 engages the rear surface of housing 56 as illustrated in FIG. 5 and the connecting rod 54 will be locked to the housing 56 to prevent further pivoting of the backrest portion 22. If, on the other hand, the backrest portion is reclined beyond its rearmost position or tilted forward beyond its most upright position, the connecting rod 54 is not locked to the housing 56 but instead may continue to slide with respect to the housing until it reaches the position in which the mating teeth engage one another to lock the backrest portion 22 in position.

It can thus can be seen that the backrest recliner mechanism 30 contains a minimum of components and thus can be quickly and easily assembled and mounted on the seat shell 20. Mounting and assembly are further simplified by designing the mechanism 30 such that the housing 56 and connecting rod 54 both pivot about the same trunnion 89. The construction is further simplified by using the energy of the backrest biasing spring 60 to bias the backrest recliner mechanism into a locking position.

4. Second Embodiment of the Backrest Recliner Mechanism

The backrest recliner mechanism 30 offers the advantages discussed above and works well on relatively light seats or on seats which are small enough so that a backrest biasing spring having a relatively low spring constant can be used. However, when the backrest recliner mechanism must be used on heavy seats or when space constraints require that the backrest biasing spring must have a high spring constant, the biasing forces imposed on the actuating handle 58 through the locking pawl 94 can in some cases impede the disengagement of the locking mechanism formed by teeth 80 of housing 56.

Referring now to FIGS. 9–15, these drawbacks can be alleviated by replacing the backrest recliner mechanism 30 with a backrest recliner mechanism 130 which is in most respects similar to the backrest recliner mechanism 30 and offers the same advantages. Those elements of the backrest recliner mechanism 130 which find corresponding elements in the backrest recliner mechanism 30 are denoted by reference numerals which are increased with respect to those representing the corresponding elements in the backrest recliner mechanism 30 by 100.

Backrest recliner mechanism 130 is connected to the same clevis 34 and cradle 36 of the seat assembly 20 of the first embodiment and is actuated by a handle having the same lever 92. Backrest recliner mechanism 130 includes a connector (formed by a connecting rod 154), a housing 156, an actuating handle 158, a backrest biasing spring 160, a spring retainer 162, and a locking mechanism 180 formed on housing 156. Connecting rod 154 is identical to the connecting rod 54 of the first embodiment and includes a first end 164 having a transverse bore 166 formed therein for receiving the pin 32 and having a shoulder 168 for abutting the rear end of backrest biasing spring 160. The connecting rod 154 extends forwardly of this first end through the housing 156 and terminates at a second end 170. Teeth 172 are formed on the lower surface of the connecting rod 154 for mating with complimentary teeth 180 which are formed in the housing 156 and which form the locking mechanism.

Housing 156 has opposed side walls 174 and 176 which define a longitudinal slot 175 (FIG. 11) therebetween for the passage of the connecting rod 154 and which are connected by a base 178 having the teeth 180 formed thereon. The rear faces 182 and 184 of side walls 174 and 176 differ from the corresponding faces of the housing 56 in that they present ramped surfaces 183 and 185 the shape of which complement the shape of the second abutment surface 218 of the spring retainer 162. As will be explained in more detail below, these ramped surfaces take the place of the rear face of the locking pawl of the backrest recliner mechanism 30. The faces 182 and 184 are connected by an upper cross bar 187 which engages the locking pawl 194 in a manner discussed in more detail below. The slot 175 has front and rear ends 222 and 224 the shapes of which are identical to the corresponding ends 122 and 124 of the housing 56 of the first embodiment.

Actuating handle 158 includes a locking pawl actuator 190 and a lever (not shown). Locking pawl actuator 190 has formed thereon an inner head 196 and an outer ring 198 which hold the actuator in place after assembly. A locking pawl 194 is formed integral with locking pawl actuator 190 and has a head 200 having an eyelet 201 (FIG. 11) formed thereon for engaging a locking pawl biasing spring 226 in a manner discussed in more detail below. Locking pawl 194 further includes a tail 204 also discussed in more detail below.

Spring retainer 162 includes a generally cylindrical body 210 having a head 212 formed on the front end thereof and having a generally rectangular longitudinal slot 214 formed therethrough for the passage of connecting rod 154. The rear face of head 212 forms a first abutment surface 216 (FIGS. 9 and 11) for engaging the front end of backrest biasing spring 160. A second abutment surface 218 (FIGS. 9 and 11) for engaging the ramped surfaces 183 and 185 of housing 156 is formed on the front face of head 212.

The backrest recliner mechanism 130 can be assembled and mounted in seat assembly 20 in the following manner. First, backrest biasing spring 160 is slid onto the body of connecting rod 154 so that its rear end rests on the shoulder 168 of the first end 164 thereof. Then, the spring retainer 162 is inserted onto the connecting rod 154 so that its first abutment surface 216 engages the front end of spring 160. Meanwhile, the locking pawl actuator 190 of handle 158 is inserted into an enlarged "window" 228 formed in the housing 156 and inserted in a seat 230 defined by the upper end of window 228. The front end of locking pawl biasing spring 226 is then connected to the eyelet 201 of locking pawl 194 and the rear end thereof is connected to a hook 232 projecting upwardly from the housing 156. The housing 156 is then inserted onto the connecting rod 154. Then, the backrest recliner mechanism 130 is mounted to the seat 20 in the same manner as the backrest recliner mechanism 30.

The operation of the backrest recliner mechanism 130 will now be described with reference to FIGS. 12–15. The backrest recliner mechanism 130 normally assumes the position illustrated in FIG. 12 with the locking mechanism being in an engaged position in which the teeth 172 on the connecting rod 154 engage the complementary teeth 180 on the housing 156 to lock the connecting rod 154 in position, and with the front face of the head 200 of locking pawl 194 resting on the housing 156. Then, the handle 158 is rotated from the position illustrated in FIG. 12 to that illustrated in FIG. 13. During this rotation, tail 204 of locking pawl 194 rotates through an over-center position. However, because the locking pawl 194 does not contact the spring retainer 162, this rotation is resisted only by the relatively small biasing forces of locking pawl biasing spring 226.

Figure 13:
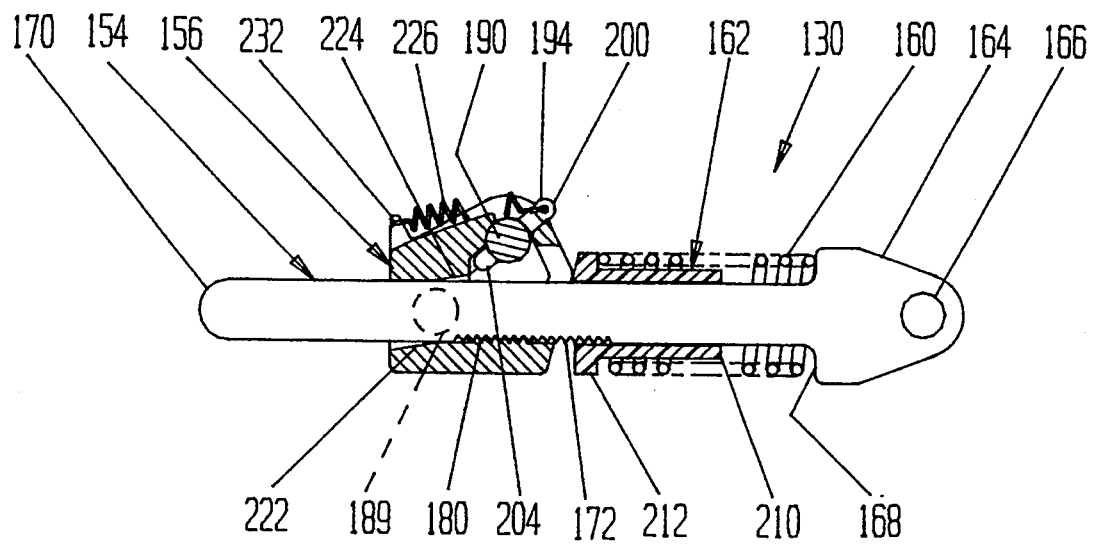
Figure 14:
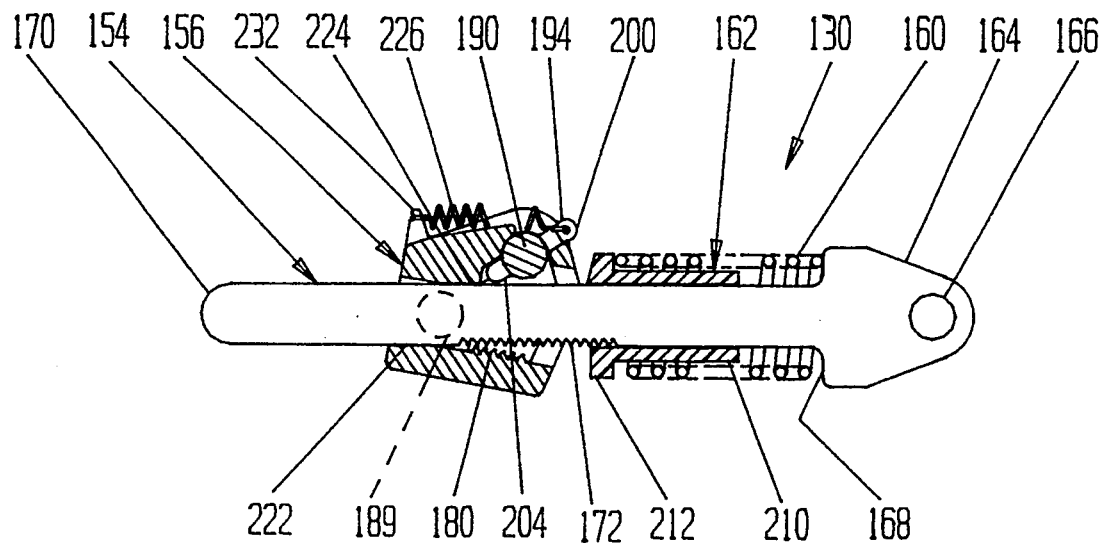
Figure 15:
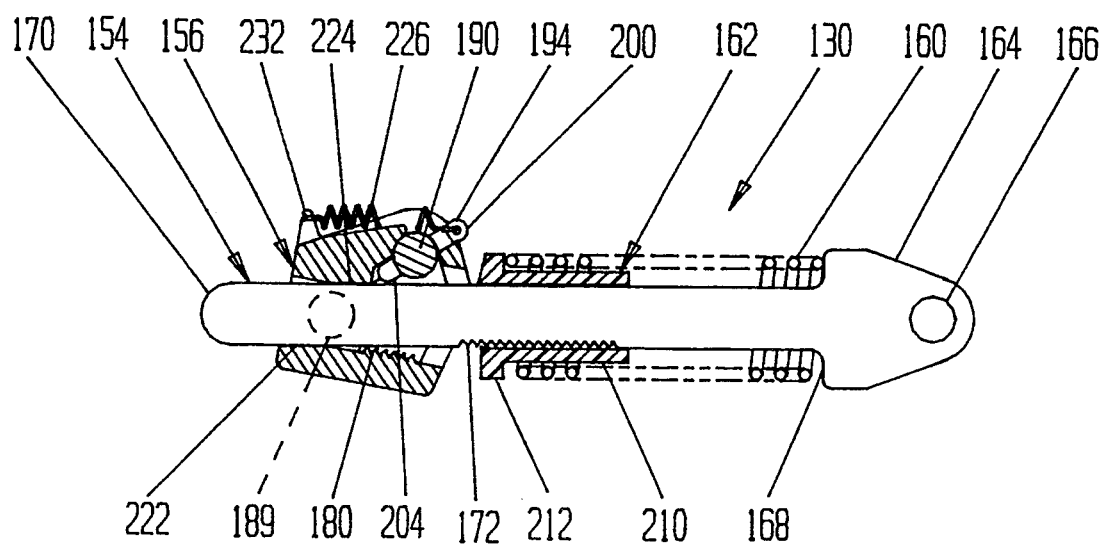

Rotation of the locking pawl actuator portion 190 of handle 158 beyond the position illustrated in FIG. 13 is prevented by engagement of the head 200 of locking pawl 194 with the cross bar 187. Accordingly, further rotation of the actuating handle results in the pivoting of housing 156 with respect to the connecting rod 154 as illustrated in FIG. 14, thus unlocking the locking mechanism, defined by the teeth 180, from the teeth 172. This rotation causes the ramped surfaces 183 and 185 to slide along the second abutment surface 218 of spring retainer 162 and to compress the backrest biasing spring 160 as illustrated in FIG. 14. The connecting rod 154 is now free to slide with respect to housing 156 as illustrated in FIG. 15 to permit the backrest portion 22 to recline. Housing 156 and connecting rod 154 will pivot as a unit about trunnion 189 when the backrest portion 22 reclines so that the connecting rod 154 remains generally orthogonal to pin 32. Upon releasing the handle, the backrest biasing spring 160 will force the second abutment surface 218 of the spring retainer 162 to act as a cam which engages the mating surfaces 183, 185 of the housing 156 to pivot the housing about the trunnion 189 back to a position in which the slot 175 is generally parallel to the connecting rod 154. The handle 158 is then rotated back into its initial position under the biasing force of locking pawl biasing spring 226, and the locking mechanism formed by teeth 180 engages the teeth 172 on connecting rod 154.

It can thus be seen that by moving the cam surface from the locking pawl to the front of the housing, the forces required for release and initial rotation of the handle 156 are significantly reduced. Thus, the backrest recliner mechanism 130, while incorporating an additional biasing spring, requires lower forces to operate.

The backrest recliner mechanisms 30 and 130 discussed above include relatively few components, are easy to assemble and to mount in the seat, and facilitate reclining of the backrest while at the same time providing secure locking of the backrest in position during normal use. Of course, the invention is not limited to the specific embodiments discussed above. Many modifications and changes which could be effected without departing from the spirit and scope of the invention will become more readily apparent from a reading of the appended claims.

I claim:

1. A seat assembly comprising:
   a. a seat shell including
      i. a seat cushion portion, and
      ii. a backrest portion pivotally connected to said seat cushion portion; and
   b. a backrest recliner mechanism including
      i. a connector having a first end connected to said backrest portion and having a second end,
      ii. a backrest biasing spring which biases said backrest portion towards an extreme position, and
      iii. a locking mechanism which engages said connector between said first and second ends, and which is movable from
         (1) a first position preventing movement of said connector relative to said locking mechanism and thus preventing said backrest portion from reclining, to
         (2) a second position permitting movement of said connector relative to said locking mechanism and thus permitting said backrest portion to recline, said locking mechanism being biased towards said first position by said backrest biasing spring.

2. A seat assembly as defined in claim 1, wherein said seat cushion portion and said backrest portion are each formed from molded plastic elements.

3. A seat assembly as defined in claim 1, wherein said locking mechanism and said connecting rod are both pivotable with respect to said seat cushion portion about a single pivot line.

4. A seat assembly as defined in claim 1, wherein said extreme position comprises an upright position.

5. A seat assembly as defined in claim 1, wherein
   a. said connector comprises an elongated connecting rod,
   b. said backrest recliner mechanism further comprises a housing which is pivotable from said first position to said second position and which is supported on said seat cushion portion, and wherein
   c. said locking mechanism includes engagement devices which are formed on said housing and which lockingly engage mating engagement devices on said connecting rod.

6. A seat assembly as defined in claim 3, wherein said backrest recliner mechanism further comprises a handle which is rotatably mounted in said housing and which, when rotated, drives said housing to move said locking mechanism from said first position to said second position.

7. A seat assembly as defined in claim 4, wherein said backrest recliner mechanism further comprises
   a. a spring retainer which is slidably mounted on said connecting rod and which has first and second abutment surfaces which abut said backrest biasing spring and said locking mechanism, respectively,
   b. a stop which is provided on said handle and which engages said housing upon a designated rotation of said handle from an initial position of rest, thus preventing further rotation of said handle relative to said housing and assuring that further rotation of said handle results in pivoting of said housing, and
   c. a locking pawl which is provided on said handle.

8. A seat assembly as defined in claim 5, wherein said locking pawl abuts said second abutment surface of said spring retainer after a designated angle of rotation so that further rotation of said handle with respect to said housing is resisted by said backrest biasing spring.

9. A seat assembly as defined in claim 5, wherein said housing and said second abutment surface of said spring retainer have complimentary surfaces which are biased into engagement with one another by said backrest biasing spring such that said second abutment surface of said spring retainer urges said locking mechanism towards said first position.

10. A seat assembly as defined in claim 7, wherein said backrest recliner mechanism further comprises a locking pawl biasing spring which is connected to said locking pawl and to said housing and which biases said locking pawl and said handle towards said position of rest.

11. A seat assembly comprising:
    a. a seat shell including
       i. a seat cushion portion, and
       ii. a backrest portion pivotally connected to said seat cushion portion; and
    b. a backrest recliner mechanism including
       i. a connecting rod having a first end connected to said backrest portion and having a second end,
       ii. a backrest biasing spring which biases said backrest portion towards an upright position, and
       iii. a housing which slidably receives said connecting rod between said first and second ends, and which is movable from
          (1) a first position in which teeth formed in said housing engage mating teeth on said connecting rod to prevent movement of said connecting rod relative to said housing and thus to prevent said backrest portion from reclining to
          (2) a second position in which said teeth on said housing are disengaged from said teeth on said connecting rod to permit movement of said connecting rod relative to said housing and thus to permit said backrest portion to recline, said housing being biased towards said first position by said backrest biasing spring,
       iv. a handle which is rotatably mounted in said housing and which, when rotated, drives said housing to pivot from said first position to said second position, said handle including
          (1) a stop which is provided on said handle and which engages said housing upon a designated rotation of said handle from an initial position of rest, thus preventing further rotation of said handle relative to said housing and assuring that further rotation of said handle results in pivoting of said housing, and
(2) a locking pawl which is provided on said handle, and
v. a spring retainer which is slidably mounted on said connecting rod and which has first and second abutment surfaces which abut said backrest biasing spring and said housing, respectively.

12. A backrest recliner mechanism for controlling the reclining of a backrest portion of a seat shell with respect to a seat cushion portion of said seat shell, said backrest recliner mechanism comprising:
  a. a connector having a first end which is connectable to said backrest portion and having a second end;
  b. a backrest biasing spring which, in use, biases said backrest portion towards an upright position; and
  c. a locking mechanism which engages said connector between said first and second ends, and which, in use, is movable from
    i. a first position preventing movement of said connector relative to said locking mechanism, to
    ii. a second position permitting movement of said connector relative to said locking mechanism, said locking mechanism being biased towards said first position by said backrest biasing spring.

13. A backrest recliner mechanism as defined in claim 12, wherein said connector comprises an elongated connecting rod, said backrest recliner mechanism further comprises a housing which is pivotable from said first position to said second position and which is supported on said seat cushion portion, and wherein said locking mechanism includes engagement devices on said housing which lockingly engage mating engagement devices on said connecting rod.

14. A backrest recliner mechanism as defined in claim 13, further comprising a handle which is rotatably mounted in said housing and which, when rotated, drives said housing to pivot said locking mechanism from said first position to said second position.

15. A backrest recliner mechanism as defined in claim 14, further comprising a spring retainer which is slidably mounted on said connecting rod and which has first and second abutment surfaces which abut said backrest biasing spring and said locking mechanism, respectively.

16. A backrest recliner mechanism as defined in claim 15, further comprising
  a. a stop which is provided on said handle and which engages said housing upon a designated rotation of said handle from an initial position of rest, thus preventing further rotation of said handle relative to said housing and assuring that further rotation of said handle results in pivoting of said housing, and
  b. a locking pawl which is provided on said handle.

17. A backrest recliner mechanism as defined in claim 16, wherein said locking pawl abuts said second abutment surface of said spring retainer after a designated angle of rotation so that further rotation of said handle with respect to said housing is resisted by said backrest biasing spring.

18. A backrest recliner mechanism as defined in claim 16, wherein said housing and said second abutment surface of said spring retainer have complimentary surfaces which are biased into engagement with one another by said backrest biasing spring such that said second abutment surface of said spring retainer urges said housing towards said first position.

19. A backrest recliner mechanism as defined in claim 18, wherein said backrest recliner mechanism further comprises a locking pawl biasing spring which is connected to said locking pawl and to said housing and which biases said locking pawl and said handle towards said position of rest.

20. A backrest recliner mechanism for controlling the reclining of a backrest portion of a seat shell with respect to a seat cushion portion, said mechanism comprising:
  a. a connecting rod having a first end which is connectable to said backrest portion and having a second end;
  b. a backrest biasing spring which, in use, biases said backrest portion towards an upright position;
  c. a housing which includes a locking mechanism which engages said connecting rod between said first and second ends, and which is pivotable from (1) a first position preventing movement of said connecting rod relative to said housing, to (2) a second position permitting movement of said connecting rod relative to said housing; and
  d. a spring retainer which is slidably mounted on said connecting rod and which has first and second abutment surfaces which abut said backrest biasing spring and said locking mechanism, respectively, said housing and said second abutment surface of said spring retainer having complimentary surfaces which are biased into engagement with one another by said backrest biasing spring such that said second abutment surface of said spring retainer urges said housing towards said first position.

21. A backrest recliner mechanism as defined in claim 20, further comprising
  a. a handle having a locking pawl provided thereon, said handle being rotatable with respect to said housing from a position of rest to a further position in which further rotation of said handle relative to said housing is prevented, and which, when rotated beyond said further position, pivots said housing from said first position to said second position, and
  b. a locking pawl biasing spring which is connected to said locking pawl and to said housing and which biases said handle towards said position of rest.

22. A method of reclining the backrest of a seat assembly with respect to a seat thereof, said backrest being pivotally mounted to said seat and being coupled to said seat by a backrest recliner mechanism including a connector having a first end connected to said backrest and having a second end, said backrest being biased towards an extreme position by a backrest biasing spring, said method comprising the steps of:
  a. disengaging a locking mechanism, which, when engaged, prevents movement of said connector relative to said seat and thus prevents said backrest from reclining;
  b. moving said locking mechanism against the biasing force of said backrest biasing spring from a first position to a second position permitting movement of said connector relative to said seat and thus permitting said backrest to recline;
  c. pivoting said backrest about said seat, thereby reclining said backrest; and
  d. releasing said locking mechanism and permitting said locking mechanism to move back into said first position under the biasing force of said backrest biasing spring.

23. A method as defined in claim 22, wherein
   a. said locking mechanism comprises teeth on a housing which engage complementary teeth on said connector, said housing supporting said connector,
   b. said step a. comprises disengaging said teeth,
   c. said step b. comprises pivoting said housing with respect to said connector, and
   d. said step c. comprises pivoting said housing and said connector about a common pivot line while said backrest pivots.

24. A method as defined in claim 22, wherein said backrest biasing spring biases said seat back towards an upright position.

25. A seat assembly comprising:
   a. a seat shell including
      i. a seat cushion portion, and
      ii. a backrest portion pivotally connected to said seat cushion portion; and
   b. a backrest recliner mechanism including
      i. a connecting rod having a first end connected to said backrest portion and having a second end,
      ii. a backrest biasing spring which biases said backrest portion towards an extreme position, and
      iii. a locking mechanism which engages said connecting rod between said first and second ends, and which is movable from
         (1) a first position preventing movement of said connecting rod relative to said locking mechanism and thus preventing said backrest portion from reclining, to
         (2) a second position permitting movement of said connecting rod relative to said locking mechanism and thus permitting said backrest portion to recline, wherein said locking mechanism is pivotable with respect to said connecting rod about a pivot line and said connecting rod is pivotable with respect to said seat cushion portion about said pivot line, said locking mechanism being biased towards said first position by said backrest biasing spring.

26. A seat assembly as defined in claim 10, wherein said extreme position comprises an upright position.

* * * * *